United States Patent [19]
Colin et al.

[11] Patent Number: 5,413,363
[45] Date of Patent: May 9, 1995

[54] SNOW SLED

[76] Inventors: Russell O. Colin; Bernadette D. Colin, both of 4981 Priscilla La., Sacramento, Calif. 95820

[21] Appl. No.: 178,009
[22] Filed: Jan. 6, 1994
[51] Int. Cl.⁶ .............................. B62B 13/16
[52] U.S. Cl. .................. 280/14.1; 280/19.1; 280/20; 280/28.11
[58] Field of Search ............... 280/14.1, 15, 845, 19.1, 280/20, 27, 28.11, 28.12, 28.16, 812, 16, 17, 18, 23.1, 275, 25, 28; 74/543; 403/83, 87

[56] References Cited

U.S. PATENT DOCUMENTS

| | | | |
|---|---|---|---|
| 448,442 | 3/1891 | Latta | 280/275 |
| 3,580,592 | 5/1971 | Schrecengost | 280/20 |
| 3,583,722 | 6/1971 | Jacobson | 280/27 |
| 4,573,695 | 3/1986 | Kennel | 280/20 |
| 5,242,176 | 9/1993 | Hendrickson | 280/25 |
| 5,249,321 | 10/1993 | Graf | 280/845 |

FOREIGN PATENT DOCUMENTS 0109602  8/1966  Norway ............ 280/28.11

Primary Examiner—Margaret A. Focarino
Assistant Examiner—Anne Marie Boehler

[57] ABSTRACT

A snow sled comprising a first substantially U-shaped frame having a cross brace that interconnects the first and second side. A second substantially U-shaped frame pivotally connected to the front end of the first frame. A first handle assembly is positioned upon the first frame. A second handle assembly is positioned upon the second frame. A seat assembly is positioned perpendicular to the cross brace. Two forward skis and two rearward skis are secured to the respective second frame and first frame.

2 Claims, 4 Drawing Sheets

SNOW SLED

BACKGROUND OF THE INVENTION

1. Field of the Invention

The present invention relates to a snow sled and more particularly pertains to a portable snow sledding device.

2. Description of the Prior Art

The use of sleds is known in the prior art. More specifically, sleds heretofore devised and utilized for the purpose of snow sledding are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,737,172 to Clement a snow sled which is composed of several flat boards pivotally connected to one another.

U.S. Pat. No. 4,254,964 to Gibson discloses a collapsible snow sled. The sled includes a deck for sitting and a single runner front unit which also has a deck.

U.S. Pat. No. 4,678,445 to Monreal discloses a water or snow wishbone shaped sled.

U.S. Pat. No. 3,794,341 to Torok discloses a snow sled. The sled includes a disk shaped platform and a steering support member.

Furthermore, U.S. Pat. No. 3,511,517 to Hill discloses a snow sled. The sled includes a top and bottom plastic shell which are closed upon each other to define a space therebetween.

In this respect, the snow sled according to the present invention substantially departs from the conventional concepts and designs of the prior art, and in doing so provides an apparatus which has great stability and is readily portable.

Therefore, it can be appreciated that there exists a continuing need for new and improved snow sled which are portable. In this regard, the present invention substantially fulfills this need.

SUMMARY OF THE INVENTION

In view of the foregoing disadvantages inherent in the known types of sleds now present in the prior art, the present invention provides an improved snow sled. As such, the general purpose of the present invention, which will be described subsequently in greater detail, is to provide a new and improved snow sled and method which has all the advantages of the prior art and none of the disadvantages.

To attain this, the present invention essentially comprises a snow sled comprising a first substantially U-shaped frame having a front end, a rear end, a first side and a second side. The first and second sides both have interior and exterior surfaces. A cross brace inter connects the first side and the second side, the cross brace is positioned adjacent the front end of the first frame. The cross brace has a first end connected to the first side of the first frame, and a second end connected to the second side of the first frame. A second substantially U-shaped frame has a front end, a rear end, a first side and a second side, the first and second sides both have interior and exterior surfaces. The front end of the first frame is pivotally connected to the rear end of the second frame, the first and second frames together defines one superframe. A first handle assembly is positioned upon the first side of the first frame, and a second handle assembly is positioned upon the second side of the first frame, with each handle assembly having a handle with two legs and a cross piece therebetween. Each of the two legs has a threaded internal aperture. The two legs are pivotally mounted within a set of slots. The slots are formed within one of the sides of the first frame adjacent one of the ends of the cross brace. The slots function to permit the pivoting of the handle only towards the exterior surface of one of the sides of the first frame. A first set of apertures are formed beneath the set of slots, a second set of apertures are formed adjacent the set of slots and through the interior surface of one of the sides of the first frame. A set of screws are adapted to be positioned in one of two orientations, in the first orientation the screws are positioned through the first set of slots and within the threaded internal apertures of the legs of the handle, and in the second orientation the screws are positioned through the second set of slots and within the threaded internal apertures of the legs of the handle.

A hinge locking assembly includes an aperture formed within the forward end of the first side of the first frame, an aperture is formed within the forward end of the second side of the first frame, an aperture is formed within the rearward end of the first side of the second frame, and an aperture formed within the rearward end of the second side of the second frame. A set of U-shaped locking pins, each pin is adapted to be inserted into the apertures of one side of both the first and second frame. A seat assembly includes a slot positioned within the cross brace intermediate its first and second ends, an aperture is formed within the cross brace intermediate its first and second ends. The aperture is formed perpendicular to and in communication with the slot. A U-shaped seat holder is positioned perpendicular to the cross brace and has a first and a second leg, the first leg has a plurality of apertures formed along its length, the second leg has a seat portion formed along its length. A spring biased is positioned within the aperture of the cross brace. The spring biased is adapted for selective engagement with one of the plurality of apertures formed along the length of the first leg. The selection of the aperture into which the handle is engaged determines the position of the seat holder relative to the cross brace. A brake assembly including an angled is formed within the forward end of the second frame. A brake element has a first end adapted for engagement with an operators foot, and a second end adapted to be inserted into snow. The brake element is positioned within the angled slot of the second frame. The brake element being is oriented such that the first end is positioned towards the rear end of the second frame and the second end is positioned towards the front end of the second frame. A spring element serves to connect the second end of the brake element to the forward end of the second frame. Two forward male binding elements are positioned upon the forward end of the second frame, two rear male binding elements are positioned upon the rearward end of the first frame. Two forward skis, each forward ski has a female binding element, the two forward skis are adapted to be secured to the two forward male binding elements. Two rearward skis, each rearward ski has a female binding element, the two rearward are adapted to be secured to the two rearward male binding elements.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved snow sled which has all the advantages of the prior art sleds and few disadvantages.

It is another object of the present invention to provide new and improved snow sled which may be easily and efficiently manufactured and marketed.

It is further object of the present invention to provide new and improved snow sled which are of durable and reliable constructions.

An even further object of the present invention is to provide new and improved snow sled which are susceptible of a low cost of manufacture with regard to both materials and labor, and which accordingly are then susceptible of low prices of sale to the consuming public, thereby making such snow sled economically available to the buying public.

Still yet another object of the present invention is to provide new and improved snow sled which provide in the apparatuses and methods of the prior art some of the advantages thereof, while simultaneously overcoming some of the disadvantages normally associated therewith.

Even still another object of the present invention is to provide a snow sled which is readily portable.

Lastly, it is an object of the present invention to provide new and improved snow sled comprising a first substantially U-shaped frame having a front end, a rear end, a first side and a second side. The first and second sides both having interior and exterior surfaces. A cross brace interconnecting the first side and the second side, the cross brace being positioned adjacent the front end of the first frame, the cross brace having a first end connected to the first side of the first frame, and a second end connected to the second side of the first frame. A second substantially U-shaped frame having a front end, a rear end, a first side and a second side, the first and second sides both having interior and exterior surfaces. The front end of the first frame being pivotally connected to the rear end of the second frame. A first handle assembly and a second handle assembly, with each handle assembly having a handle with two legs and a cross piece therebetween. The first handle assembly positioned upon the first side of the first frame, and the second handle assembly positioned upon the second side of the first frame. A seat assembly including a U-shaped seat holder positioned perpendicular to the cross brace and having a first and a second leg, the second leg having a seat portion formed along its length. Two forward male binding elements positioned upon the forward end of the second frame, and two rear male binding elements positioned upon the rearward end of the first frame. Two forward skis, each forward ski having a female binding element, the two forward skis adapted to be secured to the two forward male binding elements. Two rearward skis, each rearward ski having a female binding element, the two rearward skis adapted to be secured to the two rearward male binding elements.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
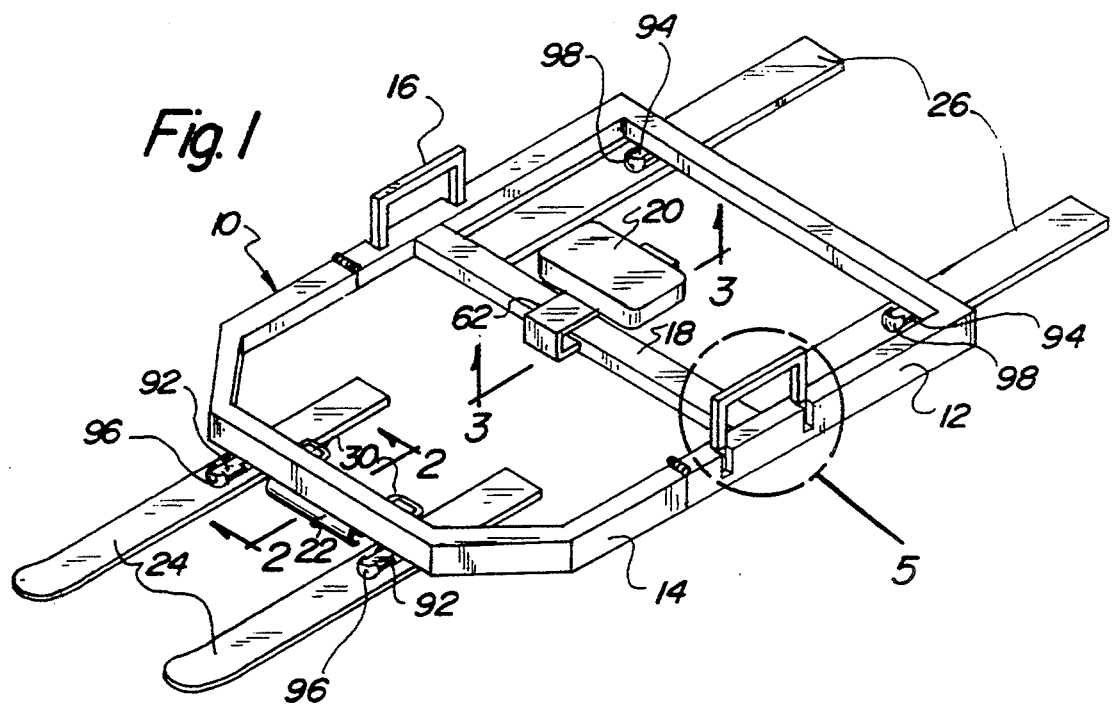
FIG. 1 is a perspective view of the preferred embodiment of the snow sled constructed in accordance with the principles of the present invention.

With reference now to the drawings, and in particular to FIG. 1 thereof, the preferred embodiment of the new and improved snow sled embodying the principles and concepts of the present invention and generally designated by the reference numeral 10 will be described.

The present invention relates to a ski sled. The ski sled is designed to be easy to use such that any operator of any ski level can enjoy the activity of skiing. The ski sled of the present invention is designed to be portable such that it can be carried onto a ski lift. In its broadest context, the ski sled includes a first frame element pivotally connected to a second frame element. Furthermore, the sled includes two handle assemblies, a cross brace which supports a seat assembly, a brake assembly, a forward set of skis, and a rearward set of skis.

The first frame element is substantially U-shaped and includes a front end, a rear end, a first side, and a second side with the first and second sides both having interior and exterior surfaces. A cross brace serves to interconnect the first side and the second side of the first frame. The cross brace is positioned adjacent the front end of the first frame. A first end of the cross brace is connected to the first side of the first frame, and a second end of the cross brace is connected to the second side of the first frame.

A second frame 14 is pivotally connected to the first frame 12. The second frame is a substantially U-shaped frame which includes a front end, a rear end, a first side, and a second side. The first and second sides of the second frame both having interior and exterior surfaces. Two foot pegs 30 are positioned at the front end of the second frame. The foot pegs are designed to support the feet of the user when the sled is in use.

Figure 5:
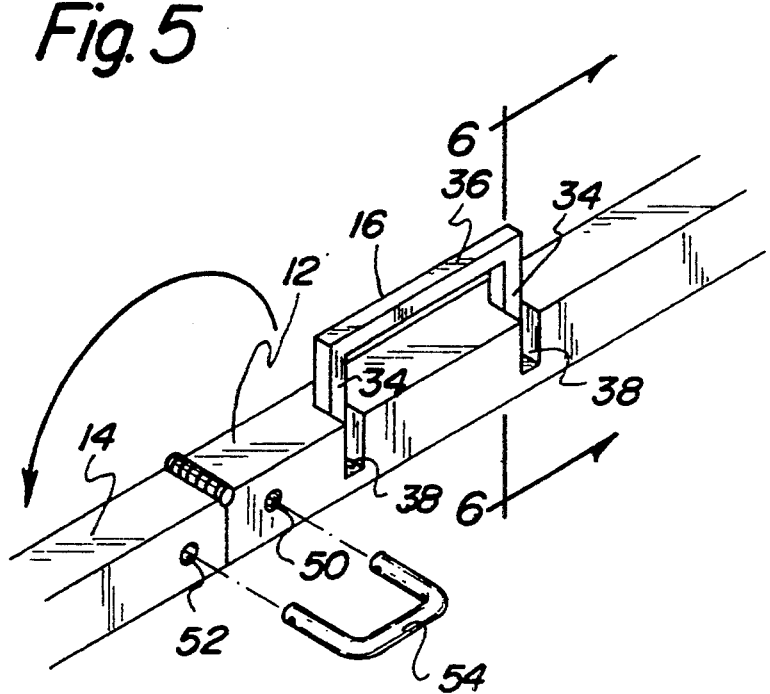
FIG. 5 is a view of the hinge assembly in accordance with the first embodiment of the present invention.

The front end of the first frame 12 is pivotally connected to the rear end of the second frame 14. Note FIG. 5. The first and second frames 12 and 14 may also be integrally constructed or constructed of plural pieces connectable together with or without a centrally located pivot capability. Together the first and second frames define a superframe. Each of the frame elements is constructed from a lightweight metal, however, a variety of other lightweight strong materials would suffice. Note FIG. 5.

Figure 6:
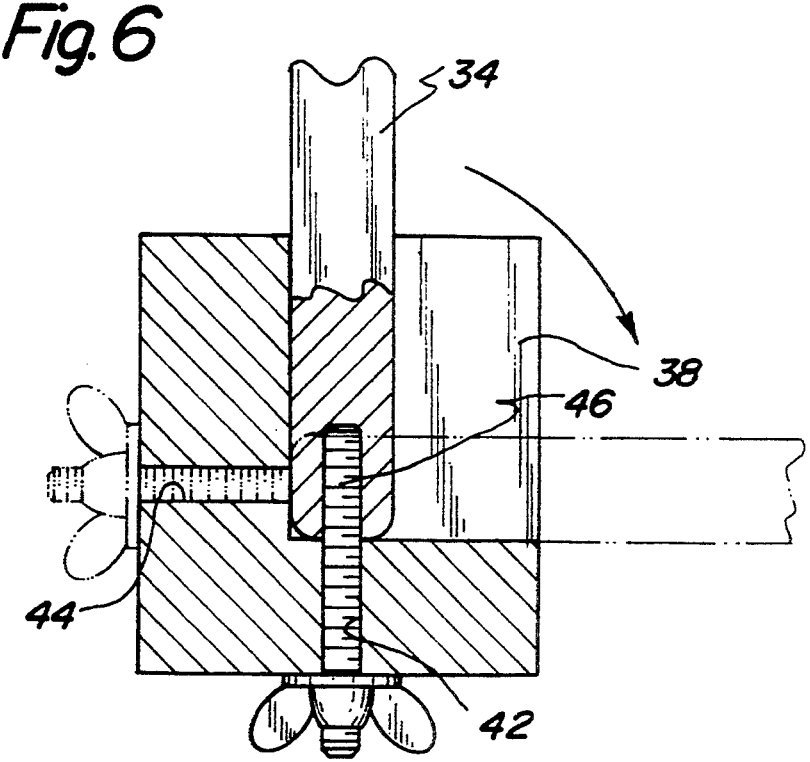
FIG. 6 is a view taken along line 6—6 of FIG. 5.
Figure 7:
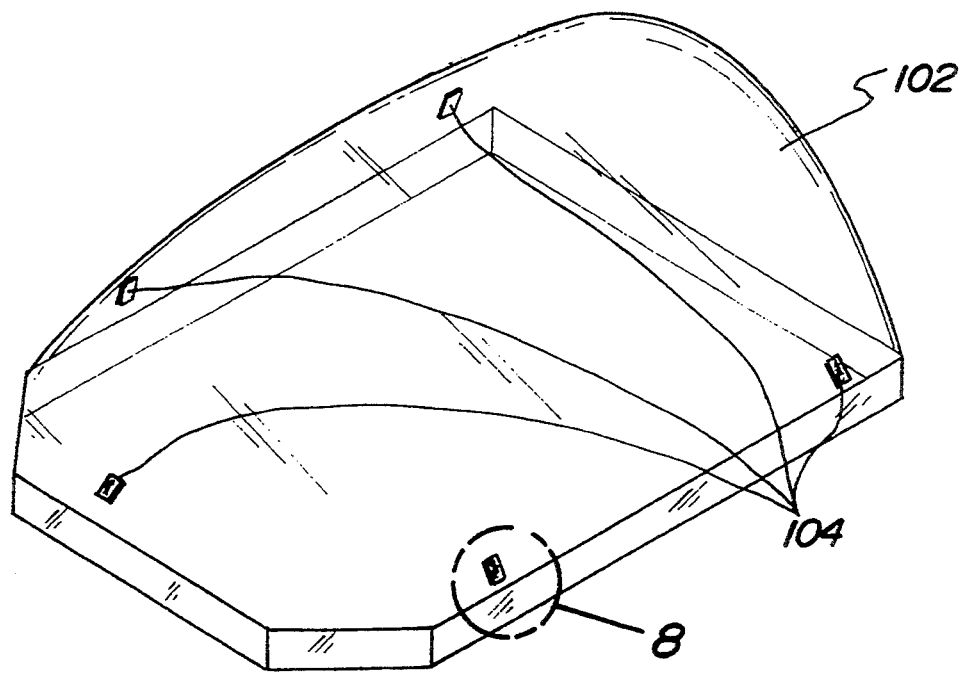
FIG. 7 is a perspective view of the second embodiment of the present invention.
Figure 8:
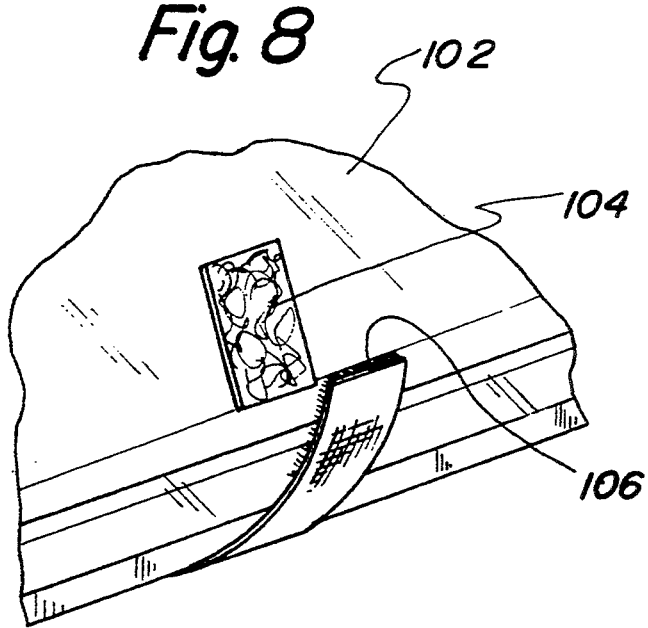
FIG. 8 is a view of the hook and pile fasteners of the second embodiment of the present invention.

The frame includes a first and a second handle assembly 16. The handle assemblies provide a user means to stabilize themselves upon the sled. Furthermore, the handle assemblies provide a means to carry the sled when it is in its folded portable configuration. A first handle assembly is positioned upon the first side of the first frame, and a second handle assembly is positioned upon the second side of the first frame. Each of the handle assemblies includes a handle with two legs 34 and a cross piece 36 therebetween. Furthermore, each of the two legs of each handle includes a threaded internal aperture. The two legs of each handle are pivotally mounted within a set of slots 38. The slots are formed within one of the sides of the first frame adjacent one of the ends of the cross brace. The slots function to permit the pivoting of the handle only towards the exterior surface of one of the sides of the first frame. Additionally, a first set of apertures 42 is formed beneath the set of slots, and a second set of apertures 44 is formed adjacent the set of slots and through the interior surface of one of the sides of the first frame. A set of screws 46 is adapted to be positioned in one of two orientations. In the first orientation, the screws are positioned through the first set of slots and within the threaded internal apertures of the legs of the handle. Note the solid line showing of FIG. 6. In the second orientation the screws are positioned through the second set of slots and within the threaded internal apertures of the legs of the handle. Note the dotted line showing of FIG. 6. The purpose of the orientations will now be described.

The first orientation corresponds to the travelling, aperture or portable, orientation. In this orientation, at least one of the handles is pivoted towards the exterior surface of its corresponding side. The screws are employed to secure the handles in its orientation. With the frame pivoted back upon its self, one of the handles in its first orientation can be employed to easily carry the entire sled assembly. The second orientation corresponds to the in use orientation. In this orientation, both of the handles are pivoted perpendicular to the first orientation. The screws are then employed to secure the handles in their orientation. In the second orientation the handles can be use to stabilize a rider, or to keep a rider from falling off.

In order to keep the first and second frame elements locked in a desired orientation, eg. a first in use orientation wherein the frame elements form a superframe, or a second traveling orientation wherein the frame elements are folded onto one another, a hinge locking assembly is included. The locking assembly includes an aperture 50 formed within the forward end of the first side of the first frame, an aperture formed within the forward end of the second side of the first frame, an aperture 52 formed within the rearward end of the first side of the second frame, and an aperture formed within the rearward end of the second side of the second frame. The hinge locking assembly further includes a set of U-shaped locking pins 54. Each of the pins is adapted to be inserted into the apertures of one side of both the first and second frame. Thus, the pins serve as a securing means to lock the frame in either its first or second orientation.

The snow sled of the present invention further includes a seat assembly 20. The seat assembly includes a slot 58 positioned within the cross brace 18 intermediate its first and second ends. The seat assembly further includes an aperture 60 formed within the cross brace intermediate its first and second ends. The aperture is formed perpendicular to, and in communication with, the slot. A U-shaped seat holder 62 is positioned perpendicular to the cross brace and has a first and a second leg. The first leg has a plurality of apertures 64 formed along its length, and the second leg has a seat 66 portion formed along its length. A spring biased handle 70 is positioned within the aperture 60 of the cross brace. The spring biased handle is adapted for selective engagement with one of the plurality of apertures 64 formed along the length of the first leg. The selection of the aperture into which the handle is engaged determines the position of the seat holder and seat relative to the cross brace.

Figure 2:
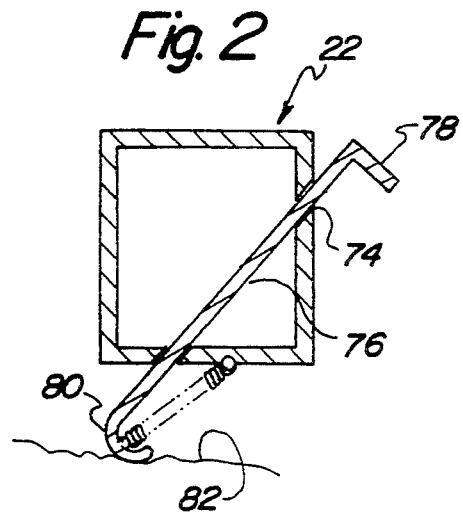
FIG. 2 is a view taken along line 2—2 of FIG. 1.
Figure 3:
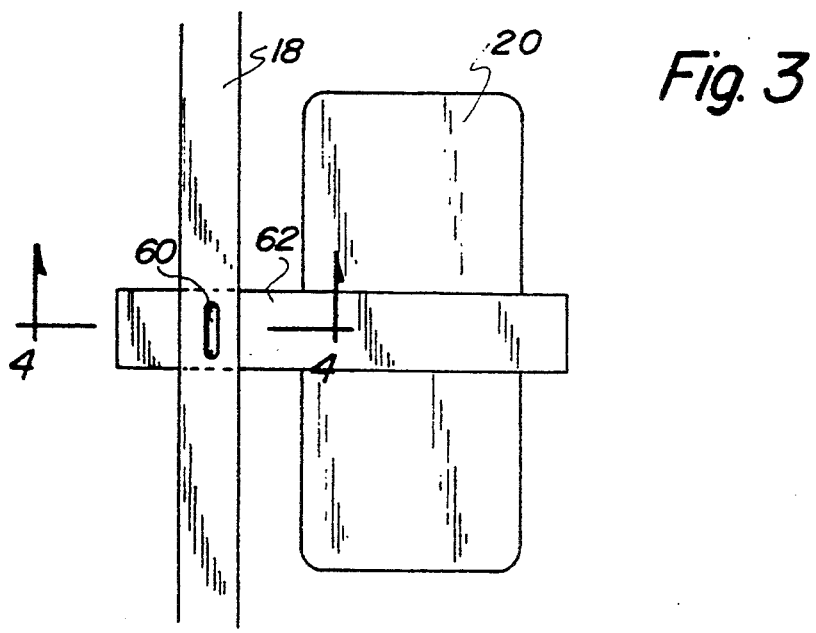
FIG. 3 is a view taken along line 3—3 of FIG. 1.
Figure 4:
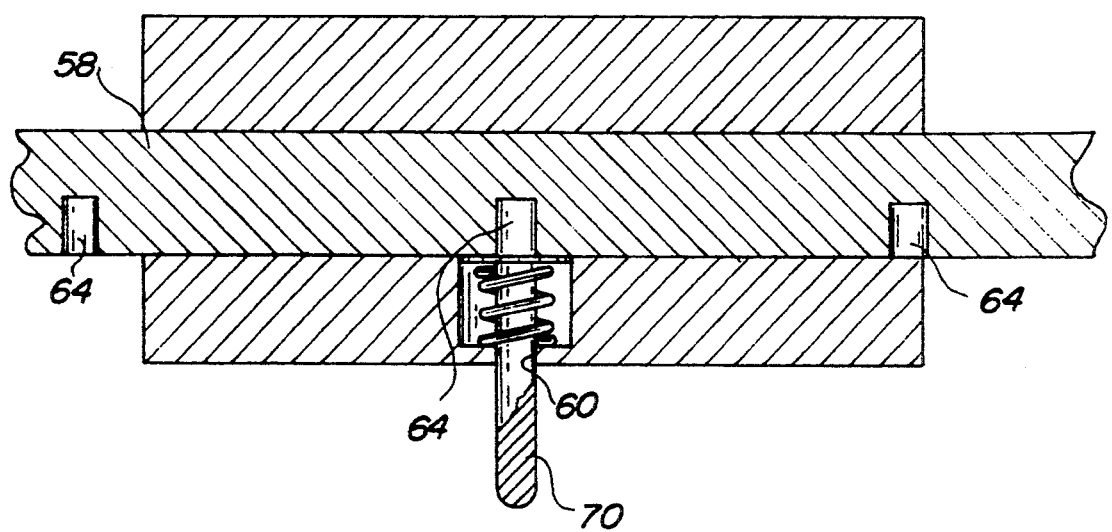
FIG. 4 is a view taken along line 4—4 of FIG. 3.

The snow sled of the present invention includes a brake assembly 22. The brake assembly includes an angled slot 74 formed within the forward end of the second frame. The assembly further includes a brake element 76 having a first end 78 adapted for engagement with an operators foot, and a second end 80 adapted to be inserted into snow 82. Note FIG. 2.

The brake element 76 is positioned within the angled slot 74 of the second frame. The brake element is oriented such that the first end is positioned towards the end of the second frame, and the second end is positioned towards the front of the second frame. Additionally, a spring element 84 serves to connect the second end of the brake element to the forward end of the second frame. Thus, the spring element serves to bias the brake element to a first or non-braking orientation.

The snow sled rides upon two sets of skis, one forward set 24 and one rearward set 26. Bindings are employed to connect each of the skis to the frames of the sled. Two forward male binding elements 92 are positioned upon the forward end of the second frame, and two rear male binding elements 94 are positioned upon the rearward end of the first frame. Two forward skis, with each forward ski having a female binding element 96, are adapted to be secured to the two forward male binding elements. Two rearward skis, with each rearward ski having a female binding element 98, are adapted to be secured to the two rearward male binding elements.

The second embodiment of the present invention is substantially the same as the first embodiment. However, in the second embodiment a sheet 102 of clear plastic is employed to cover the entire sled assembly. The sheet of clear plastic is dimensioned to fit over both the first and seconds frames of the sled. The sheet includes a plurality of pile fasteners 104 positioned about its perimeter. Furthermore, a plurality of tabs 106 are connected to both the first and second frames. The number of tabs corresponds, in number and position, to the number of pile fasteners. Furthermore, hook fasteners are positioned upon each of the tabs. Thus, if an operator wishes to keep himself or herself dry while using the sled they can fasten the sheet over the sled. The sheet can be secured to the sled by way of the hook and pile fasteners.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A snow sled comprising in combination:

a first substantially U-shaped frame having a front end, a rear end, a first side and a second side, the first and second sides both having interior and exterior surfaces, a cross brace interconnecting the first side and the second side, the cross brace being positioned adjacent the front end of the first frame, the cross brace having a first end connected to the first side of the first frame, and a second end connected to the second side of the first frame;

a second substantially U-shaped frame having a front end, a rear end, a first side and a second side, the first and second sides both having interior and exterior surfaces, the front end of the first frame being pivotally connected to the rear end of the second frame, the first and second frames together defining one superframe;

a first handle assembly positioned upon the first side of the first frame, and a second handle assembly positioned upon the second side of the first frame, with each handle assembly having a handle with two legs and a cross piece therebetween, each of the two legs having a threaded internal aperture, the two legs being pivotally mounted within a set of slots, the slots being formed within one of the sides of the first frame adjacent one of the ends of the cross brace, the slots functioning to permit the pivoting of the handle only towards the exterior surface of one of the sides of the first frame, a first set of apertures formed beneath the set of slots, a second set of apertures formed adjacent the set of slots and through the interior surface of one of the sides of the first frame, a set of screws adapted to be positioned in one of two orientations, in the first orientation the screws are positioned through the first set of slots and within the threaded internal apertures of the legs of the handle, in the second orientation the screws are positioned through the second set of slots and within the threaded internal apertures of the legs of the handle;

a hinge locking assembly including an aperture formed within the forward end of the first side of the first frame, an aperture formed within the forward end of the second side of the first frame, an aperture formed within the rearward end of the first side of the second frame, and an aperture formed within the rearward end of the second side of the second frame, a set of U-shaped locking pins, each pin adapted to be inserted into the apertures of one side of both the first and second frame;

a seat assembly including a slot positioned within the cross brace intermediate its first and second ends, an aperture formed within the cross brace intermediate its first and second ends, the aperture formed perpendicular to and in communication with the slot, a U-shaped seat holder positioned perpendicular to the cross brace and having a first and a second leg, the first leg having a plurality of apertures formed along its length, the second leg having a seat portion formed along its length, a spring biased handle positioned within aperture of the cross brace, the spring biased handle adapted for selective engagement with one of the plurality of apertures formed along the length of the first leg, the selection of the aperture into which the handle is engaged determining the position of the seat holder relative to the cross brace;

a brake assembly including an angled slot formed within the forward end of the second frame, a brake element having a first end adapted for engagement with an operators foot, and a second end adapted to be inserted into snow, the brake element positioned within the angled slot of the second frame, the brake element being oriented such that the first end is positioned towards the end of the second frame and the second end is positioned towards the front of the second frame, a spring element connecting the second end of the brake element to the forward end of the second frame;

two forward male binding elements positioned upon the forward end of the second frame;

two rear male binding elements positioned upon the rearward end of the first frame;

two forward skis, each forward ski having a female binding element, the two forward skis adapted to be secured to the two forward male binding elements; and two rearward skis, each rearward ski having a female binding element, the two rearward skis adapted to be secured to the two rearward male binding elements.

2. A snow sled comprising in combination:

a first substantially U-shaped frame having a front end, a rear end, a first side and a second side, the first and second sides both having interior and exterior surfaces, a cross brace interconnecting the first side and the second side, the cross brace being positioned adjacent the front end of the first frame, the cross brace having a first end connected to the first side of the first frame, and a second end connected to the second side of the first frame;

a second substantially U-shaped frame having a front end, a rear end, a first side and a second side, the first and second sides both having interior and exterior surfaces, the front end of the first frame being pivotally connected to the rear end of the second frame;

a first handle assembly and a second handle assembly, with each handle assembly having a handle with two legs and a cross piece therebetween, the first handle assembly positioned upon the first side of the first frame, and the second handle assembly positioned upon the second side of the first frame;

a seat assembly including a U-shaped seat holder positioned perpendicular to the cross brace and having a first and a second leg, the second leg having a seat portion formed along its length;

two forward male binding elements positioned upon the forward end of the second frame;

two rear male binding elements positioned upon the rearward end of the first frame;

two forward skis, each forward ski having a female binding element, the two forward skis adapted to be secured to the two forward male binding elements;

two rearward skis, each rearward ski having a female binding element, the two rearward skis adapted to be secured to the two rearward male binding elements;

a sheet of clear plastic dimensioned to fit over both the first and second frames of the sled, the sheet including a plurality of pile fasteners positioned about its perimeter; and a plurality of tabs connected to both the first and second frames, the number of tabs corresponding in number and position to the number of pile fasteners, hook fasteners positioned upon each of the tabs.

* * * * *